United States Patent

Bredewater et al.

[11] 4,011,456
[45] Mar. 8, 1977

[54] ULTRAVIOLET IRRADIATING APPARATUS

[75] Inventors: John R. Bredewater; Mario F. Thumudo, Jr., both of Ada, Okla.

[73] Assignee: The General Tire & Rubber Company, Akron, Ohio

[22] Filed: Oct. 20, 1975

[21] Appl. No.: 624,072

[52] U.S. Cl. .......................... 250/492 R; 250/504; 250/453
[51] Int. Cl.² .......................................... H01J 37/20
[58] Field of Search ....... 250/453, 454, 504, 492 R

[56] References Cited
UNITED STATES PATENTS

| | | | |
|---|---|---|---|
| 2,423,884 | 7/1947 | Glass | 250/504 |
| 2,645,709 | 7/1953 | Thorstensen | 250/504 |
| 3,530,294 | 9/1970 | Rogers | 250/454 |
| 3,790,801 | 2/1974 | Coleman | 250/492 |

*Primary Examiner*—Alfred E. Smith
*Assistant Examiner*—B. C. Anderson

[57] ABSTRACT

Ultraviolet irradiating apparatus including a generally enclosed upright cylindrical housing defining an entry opening and an exit opening, a linear ultraviolet radiation source vertically mounted generally along the central axis of the housing, multiple sections of reflectors formed with zig-zag configurations disposed around the cylindrical interior wall of the housing to a height about the same as the radiation source with the corners of the angles between the zig-zag reflectors disposed generally transversely to the length of the radiation source. The reflectors present specular surfaces to the radiation source which reflect about 80% of the original ultraviolet rays from the radiation source. The reflectors preferably may be formed from specular aluminum sheet. A parts conveyor is mounted to convey parts into the entry opening, then through a generally circular horizontal path between the radiation source and the reflectors and out through the exit opening. The described zig-zag reflectors cause the parts carried by the conveyor to be subjected to a greater and more concentrated exposure to ultraviolet radiation which is more evenly distributed to all exposed surfaces of the parts. An opaque baffle may be mounted as the partition between the entry and exit openings and extending vertically and radially from near the radiation source at least to the exterior of the wall of the housing.

18 Claims, 3 Drawing Figures

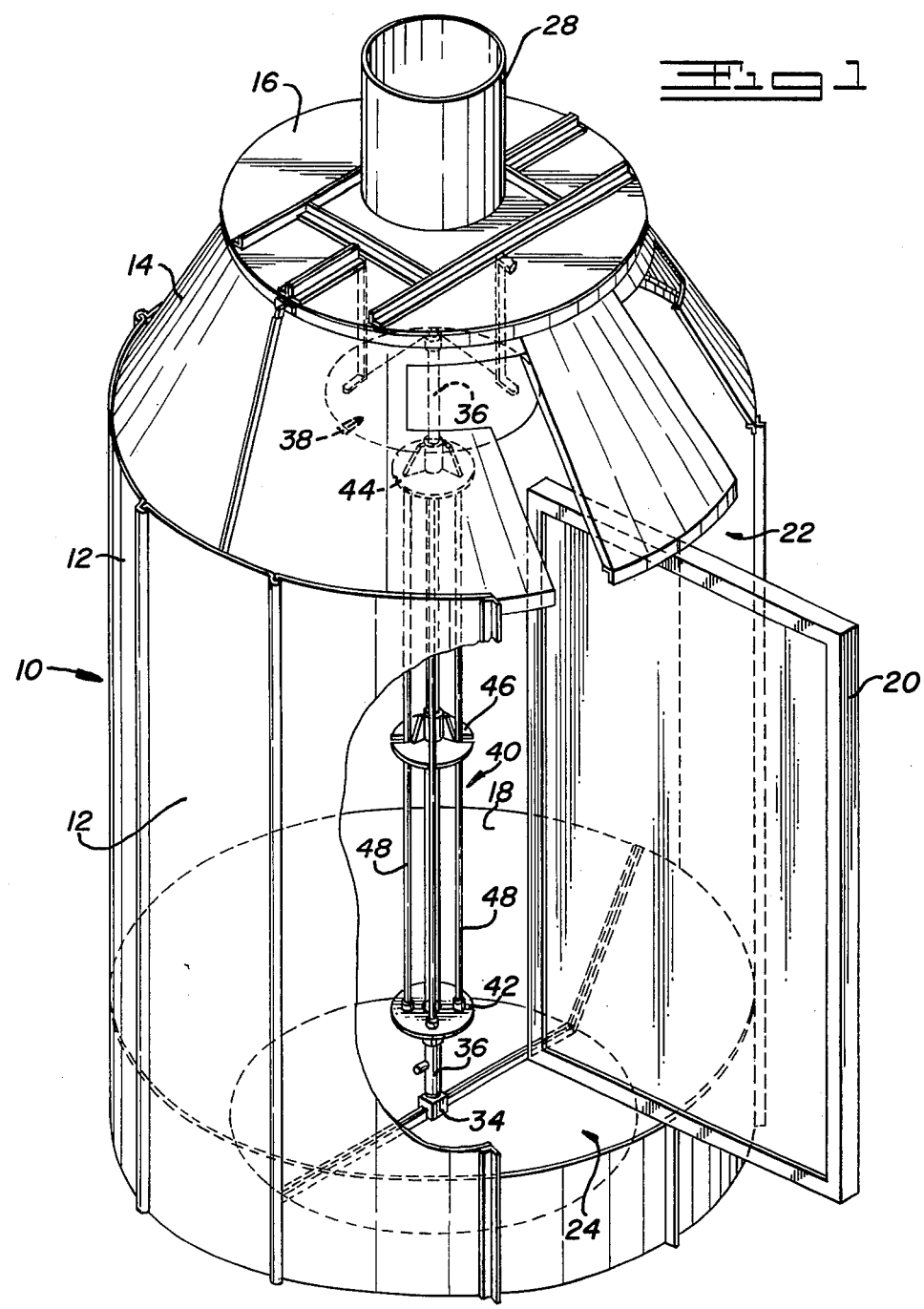

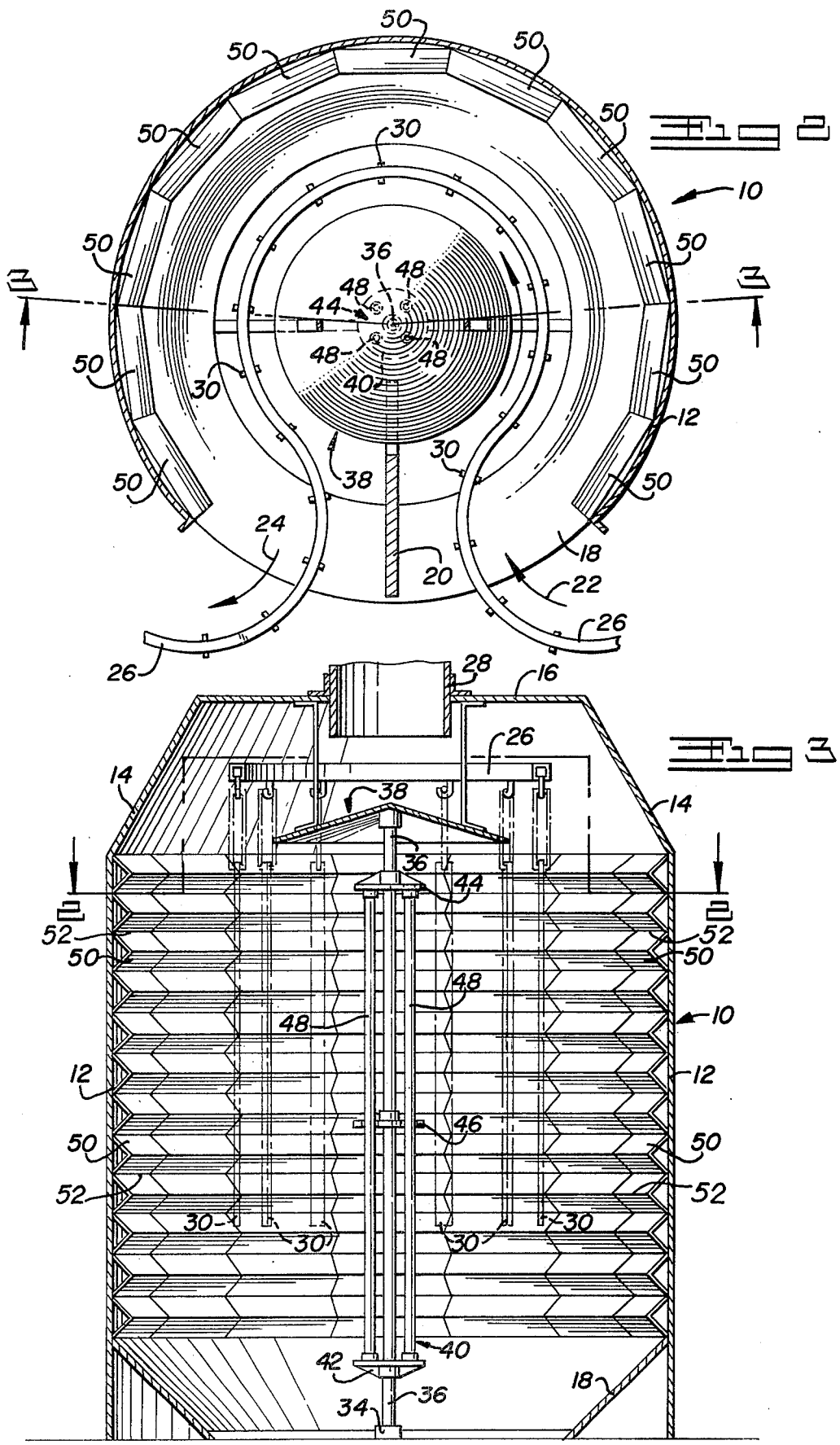

ULTRAVIOLET IRRADIATING APPARATUS

BACKGROUND OF THE INVENTION

This invention generally relates to apparatus for irradiating products or articles with radiation which can be reflected from a reflective surface. More specifically, the invention pertains to apparatus which is adapted to be installed in a conveyor line and irradiate molded and cured rubber articles, such as the rubber fascia or trim for automobiles, with ultraviolet light to prepare the surfaces of the articles to receive and retain a flexible coating such as a flexible polyurethane paint.

The process of irradiating rubber with ultraviolet light after treating the rubber with an aromatic ketone such as benzophenone to prepare the rubber surface for painting is in commercial use. Booths containing ultraviolet radiation sources through which articles are passed by conveyor are also commercially used.

Irradiating apparatus is disclosed in U.S. Pat. Nos. 2,087,751, 2,845,451, 2,876,187, 3,454,761 and 3,790,801, for example.

SUMMARY OF THE INVENTION

This invention provides apparatus which substantially increases more concentrated and evenly distributed ultraviolet irradiation to objects conveyed through the apparatus than prior apparatus utilizing the same article conveyor movement rate, using the same ultraviolet source intensity in terms of lamp arc length and wattage and using equivalent floor space.

The invention also provides the foregoing advantages with only slightly increased cost of manufacture and likely with less cost in maintenance.

The invention further provides the capability of using less electrical power per article irradiated by increasing the rate of articles conveyed through the apparatus as limited to a minimum effective reaction time for the irradiation.

The foregoing and other advantages of the invention are provided by an ultraviolet irradiating apparatus including a generally enclosed upright cylindrical housing defining an entry opening and an exit opening, and a linear ultraviolet radiation source vertically mounted generally along the central axis of the housing. Multiple sections of reflectors formed with zig-zag configurations are disposed around the cylindrical interior wall of the housing to a height about the same as the radiation source. The corners of the angles between the zig-zag reflectors preferably may be disposed generally transversely to the length of the radiation source. The reflectors present specular surfaces to the radiation source capable of reflecting about 80% of the original ultraviolet rays from the radiation source. The reflectors preferably may be formed from specular aluminum sheet. A parts conveyor is mounted to convey parts into the entry opening, then through a generally circular horizontal path between the radiation source and the reflectors and out through the exit opening. The described zig-zag reflectors cause the parts carried by the conveyor to be subjected to a greater and more concentrated exposure to ultraviolet radiation which is more evenly distributed to all exposed surfaces of the parts. An opaque baffle may be mounted as the partition between the entry and exit openings and extending vertically and radially from the vicinity of the radiation source at least to the exterior of the wall of the housing. The zig-zag reflectors are preferably disposed at an angle of about 45° with respect to the cylindrical wall of the housing or differently stated, the included angles between the zig-zag reflectors are preferably about 90°.

BRIEF DESCRIPTION OF THE DRAWINGS

In the drawing:

FIG. 1 is a perspective elevation of the apparatus but not showing the parts conveyor entering and leaving the housing.

FIG. 2 is a plan view of the apparatus taken along the line 2—2 of FIG. 3 and schematically showing the parts conveyor rail entering and leaving the apparatus.

FIG. 3 is a cross-sectional elevational view of the apparatus.

DESCRIPTION OF THE PREFERRED EMBODIMENT

As seen in FIGS. 1–3, the apparatus 10 includes a generally cylindrical side wall 12, a frustoconical upper wall 14, a flat top 16 and a lower inverted frustoconical wall 18. The walls 12 and 14 and an opaque baffle member 20 define an entry opening 22 and an exit opening 24 for the mounting (not shown) of the rail of a parts conveyor 26 and passage of parts 30 in a generally horizontal circular path through the apparatus 10. The openings 22 and 24 may be either entry or exit openings, depending on the direction of movement of conveyor 26.

The parts 30 (shown in ghost lines) may be individually suspended pieces such as the rubber fascia installed as sight shields between the bumper and body of an automobile or suspended racks respectively conveying many smaller rubber pieces. The rubber utilized may be synthetic such as EPDM, for example.

An exhaust stack 28 is mounted in the top of 16 which will generally house an exhaust fan or blower (not shown) to exhaust heat and any fumes or vapors emitted from the rubber pieces during irradiation.

A base 34, a support rod 36, and a support baffle assembly 38 support an ultraviolet (UV) source array 40 mounted generally in the center and vertically along the axis of the side wall 12 of apparatus 10.

The UV source array 40 includes a lower socket assembly 42 and upper socket assembly 44, a central support member 46 and a plurality of UV source lamps 48.

As shown, four of the UV source lamps 48 are provided in the UV source array 40. The number of source lamps may be varied in both size and number however, depending on the UV intensity desired and the size of apparatus 10. As an example, the source lamps 48 may be lamps supplied by Canrad-Hanovia Inc., 100 Chestnut St., Newark, N.J. 07105, U.S.A. The particular lamp 48 may be the Canrad-Hanovia quartz mercury lamp Catalog No. 6577A431. This lamp uses 15,000 watts and has an arc length of 77-15/32 (334 cm).

The appropriate power supply and electrical controls (not shown) also may be obtained from Canrad-Hanovia.

As shown in FIGS. 2 and 3 a plurality of reflector sections 50 are mounted to the interior side of cylindrical side wall 12 by means of screw fasteners, rivets, or the like (not shown). The reflector sections 50 are formed in zig-zag configurations with the corners 52 of the angles between the zig-zag reflectors disposed generally transversely or at right angles to the axis of the UV sources array 40. The reflector sections 50 are provided with specular reflection surfaces facing the UV source array 40. An example of material for forming reflector sections 50 is "Alzak Specular" aluminum sheet No. 3728 which can be purchased from Aluminum Company of America, 111 N.W. 23rd St., Oklahoma City, Ok. 73103, U.S.A.

The conveyor 26 disposes parts 30 about midway the reflection sections 50 and the UV source array 40 as the parts are moved through apparatus 10.

The concept of the zig-zag specular reflection sections 50 to replace a reflective paint on the inner walls of cylindrical side wall 12 provides several improvements to apparatus 10. There is far more reflective surface area to reflect the UV radiation back toward parts 30 moving through apparatus 10 along conveyor 26. Also the reflected UV from the UV source array 40 reflects at a multitude of angles to create more use of the UV rays for complete and uniform UV exposure of all surfaces of the parts 30.

Formerly the interior wall of side wall 12 was coated, for example, with a reflective paint such as DuPont 100 Series polyurethane paint obtained from DuPont Company, Wilmington, Del., 19898, U.S.A.

Such reflective paint reflected about 35% of the original UV rays. The specular aluminum reflective surface reflects back more than 80% of the original UV rays.

The reflection sections 50 have been very efficient with the respective angles of the reflectives surfaces being provided at about 45° with respect to the inner surface of side wall 12, or stated differently, the included angles of the zig-zag configuration being about 90°. Other angles between the zig-zag reflector sections 50 may be used, depending on the size, proportions and shapes of apparatus 10 including the UV source array 40.

As shown in FIG. 2, the reflection sections 50 are straight across and mounted in chordal relation to the cylindrical inner wall of side wall 12. The reflection sections can be fabricated (at greater expense) to be curved and conform to the inner surface of cylindrical side wall 12. Though curved sections may give somewhat more diffusion of the reflected UV rays, the present embodiment of straight reflection sections 50 as shown in FIGS. 2 and 3, provide far superior UV irradiation in both intensity and distribution to the exposed surfaces of parts 30, and are fabricated rather simply and with less expense than if curved as mentioned above.

It has been considered to mount zig-zag reflectors of the type herein described with the zig-zag angles of the zig-zag reflectors parallel to the length of the UV source array rather than transverse to the source array as shown in FIGS. 2 and 3. While such alternate embodiment likely would be far superior to the reflective painted walls of the prior art, the embodiment herein described is preferred as giving much greater diffusion and distribution of the UV irradiation of parts 30 having complex shapes and nooks.

The exposed inner surfaces of upper wall 14 and lower wall 18 may be coated with reflective paint as desired to maximize reflected UV radiation within the apparatus 10.

The foregoing description and drawing will suggest other embodiments and variations to those skilled in the art, all of which are intended to be included in the spirit of the invention as herein set forth.

We claim:

1. An improved ultraviolet irradiating apparatus comprising:

a. a generally enclosed upright cylindrical housing defining an entry opening and an exit opening;
   b. a linear ultraviolet radiation source vertically mounted generally along the central axis of the housing;
   c. multiple sections of reflectors formed to be shaped as zig-zag reflectors disposed around the cylindrical interior of said housing with the corners of the angles between said zig-zag reflectors being disposed generally transversely to the length of said radiation source;
   d. said zig-zag reflectors presenting specular surfaces to said radiation source, said surfaces being adapted to reflect about 80% of the direct ultraviolet rays from said radiation source;
   e. said reflectors being formed from specular aluminum sheet;
   f. a parts conveyor mounted to convey parts into said entry opening, then through a path between said radiation source and said reflectors and then out through said exit opening; and
   g. said zig-zag reflectors causing said parts carried by said conveyor to be subjected to a greater and more concentrated exposure to ultraviolet radiation which is more evenly distributed to all external surfaces of said parts.

2. The apparatus of claim 1 wherein said radiation source is comprised of at least one elongated tubular quartz mercury lamp.

3. The apparatus of claim 1 wherein said reflectors reflect up to more than 80% of the original ultraviolet rays from said radiation source.

4. The apparatus of claim 1 including an opaque baffle member disposed as the partition between said entry and said exit openings.

5. The apparatus of claim 1 wherein the reflective surfaces of said reflectors are disposed at about 45° with respect to the cylindrical wall of said housing.

6. The apparatus of claim 1 wherein said reflectors extend to about the same length as said radiation source.

7. An improved ultraviolet irradiating apparatus comprising:

a. a generally enclosed upright cylindrical housing defining an entry opening and an exit opening;
   b. a linear ultraviolet radiation source vertically mounted generally along the central axis of the housing;
   c. multiple sections of reflectors formed to be shaped as zig-zag reflectors disposed around the cylindrical interior of said housing;
   d. said zig-zag reflectors presenting specular surfaces to said radiation source;
   e. a parts conveyor mounted to convey parts into said entry opening, then through a generally circular horizontal path between said radiation source and said reflectors and then out through said exit opening; and
   f. said zig-zag reflectors causing said parts carried by said conveyor to be subjected to a greater and more concentrated exposure to ultraviolet radiation which is more evenly distributed to all external surfaces of said parts.

8. The apparatus of claim 7 wherein said radiation source is comprised of more than one elongated tubular quartz mercury lamp.

9. The apparatus of claim 7 wherein said zig-zag reflectors are formed of specular aluminum sheet.

10. The apparatus of claim 7 wherein said reflectors are adapted to reflect up to more than 80% of the original ultraviolet rays from said radiation source.

11. The apparatus of claim 7 including an opaque baffle member disposed as the partition between the entry and exit openings.

12. The apparatus of claim 7 wherein the reflective surfaces of said reflectors are disposed at 45° with respect to the cylindrical wall of said housing.

13. The apparatus of claim 7 wherein said reflectors extend to about the same length as said radiation source.

14. The apparatus of claim 7 wherein the angles of said zig-zag reflectors are disposed generally transverse to the length of said radiation source.

15. The apparatus of claim 8 wherein: said zig-zag reflectors are formed of specular metal; said reflectors reflect up to more than 80% of the original ultraviolet rays from said radiation source; the reflective surfaces of said reflectors are disposed at 45° with respect to the cylindrical wall of said housing; said reflectors extend to about the same length as said radiation source; the angles of said reflectors are disposed generally transverse to the length of said radiation source; and said apparatus including an opaque baffle member disposed as the partition between said entry and said exit openings.

16. An improved ultraviolet irradiating apparatus comprising:
   a. a generally enclosed upright cylindrical housing defining an entry opening and an exit opening;
   b. a linear ultraviolet radiation source comprising at least one tubular quartz mercury lamp vertically mounted generally along the central axis of the housing;
   c. multiple sections of metal formed with configurations to be zig-zag reflectors disposed around the cylindrical interior of said housing with the angles of said zig-zag reflectors disposed generally transversely to the length of said radiation source;
   d. said zig-zag reflectors presenting specular surfaces to the radiation source, said surfaces being adapted to reflect up to about 80% of the original ultraviolet rays from said radiation source;
   e. said reflectors being formed from specular aluminum sheet;
   f. a parts conveyor mounted to convey parts into said entry opening, then through a generally circular horizontal path between said radiation source and said reflectors and then out through said exit opening;
   g. said zig-zag reflectors causing said parts carried by said conveyor to be subjected to a greater and more concentrated exposure to ultraviolet radiation which is more evenly distributed to all external surfaces of said parts; and
   h. an opaque baffle being mounted as the partition between the entry and exit openings and extending vertically and radially from near said radiation source at least to the exterior of the wall of said housing.

17. The apparatus of claim 16 wherein the reflective surfaces of said reflectors are disposed at about 45° with respect to the cylindrical wall of said housing.

18. The apparatus of claim 17 wherein said reflectors extend to about the same length as said radiation source.

* * * * *